Dec. 19, 1950 N. KERSHAW ET AL 2,534,776
BINOCULAR
Filed Jan. 21, 1948
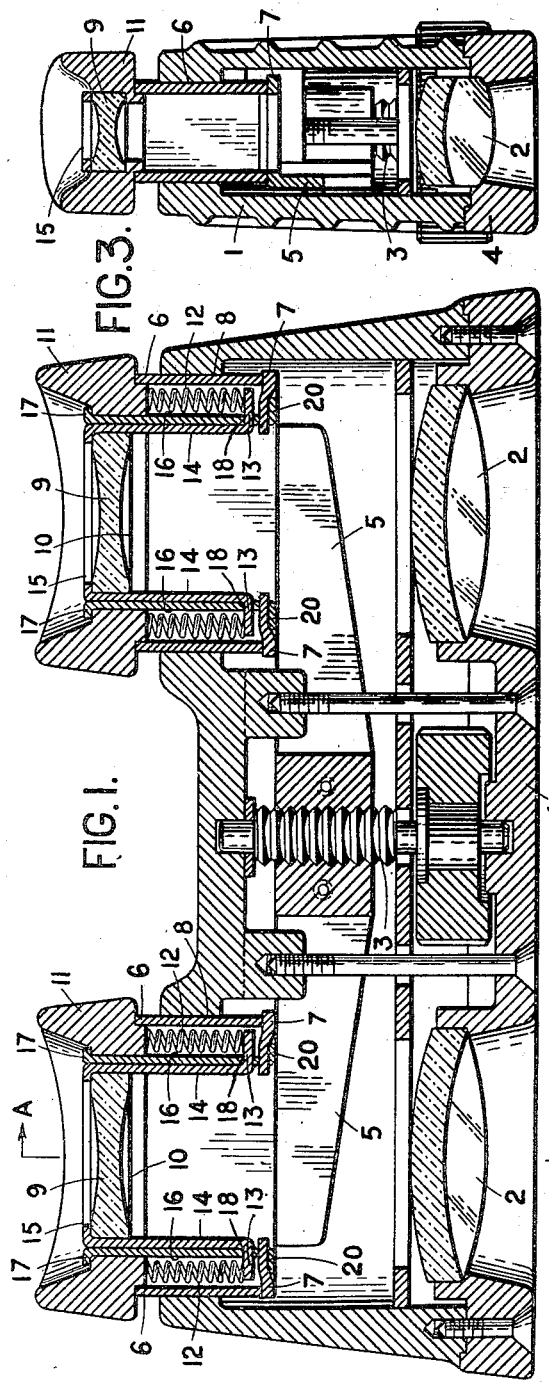
NORMAN KERSHAW and
HARRY RYDER
Inventors
By Cushman, Darby & Cushman
attys.

Patented Dec. 19, 1950

2,534,776

UNITED STATES PATENT OFFICE 2,534,776

BINOCULAR

Norman Kershaw and Harry Ryder, Leeds, England, assignors to A. Kershaw & Sons Limited, London, England Application January 21, 1948, Serial No. 3,646
In Great Britain November 27, 1946

Section 1, Public Law 690, August 8, 1946
Patent expires November 27, 1966

3 Claims. (Cl. 88—34)

This invention relates to binoculars and has for its chief object to provide a new or improved construction of binocular and method of mounting the eye lenses relative to the eye cups and bridge.

According to the invention each eye lens is retained in its eye cup by means of springs mounted in the eye cup sleeve and carried by the bridge of the binocular. The springs will preferably be mounted between the underside of the eye cup at one end and an eye lens cell at the other end in such a manner that the springs acting upon the eye lens cell will retain the lens in its seating in the eye cup. The eye cup will be secured to the bridge by means of clips bent over at the upper end to engage the eye cup and passing through slots in the lower end of the eye lens cell and further slots in the bridge member to the underside of which the clips are secured by bending over at the lower end.

In order that the invention may be clearly understood and readily carried into effect the same will now be more fully described with reference to and by the aid of the accompanying drawing in which:

Figure 1 is a sectional elevation of a binocular constructed in accordance with the invention.

Figure 2 is a plan of Figure 1.

Figure 3 is a section on the line A—A of Figure 1.

Figure 4 is a detail view of a binocular bridge.

Referred to the drawings, the binoculars comprise a body 1 having the fixed lenses 2 and focusing screw 3 retained in position by means of a bottom cover plate 4. Within the body and mounted upon the focusing screw 3 is the bridge 5 at each end of which is carried an eye-piece sleeve 6.

The bridge 5 comprises a metal or like strip having bent-over flanges 7 at each end upon which the eye-piece mechanisms are mounted.

The eye piece mechanisms each comprise a sleeve 6 aforementioned which slides in apertures 8 formed in the upper end of the body casing 1. Each eye lens 9 is retained in its seating 10 in the eye cup 11 by means of two helical springs 12 which engage against the underside of the eye cup 11 at one end and against the flanges 13 of an inverted U-shaped eye lens cell 14 at the other end. The upper end of this eye lens cell 14 is formed with an aperture 15 affording a complete frame or holder for the upper edge of the eye lens 9. Each eye cup 11 is held in position relative to the bridge by means of a pair of clips 16 which are placed one on each side of the eye lens cell. The upper ends of the clips are bent over at 17 to engage the eye cup 11, whilst the lower ends of the clips pass through slots 18 in the clips 16 and through further slots 19 of the flanges 7 of the bridge 5 beneath which they are secured by being bent over at 20.

As is evident in the drawings, the improved construction is particularly adapted to the mounting of rectangular lenses, in which case the sleeves and eye lens cells are similarly of rectangular shape. It will be appreciated that the resilient mounting of the eye lens permits individual adjustment to be made to the lenses and also facilitates assembly and renewal since it is only necessary to raise the eye lens cell against its springs after which the lens can be easily slipped into place or removed as desired.

We claim:

1. A binocular structure comprising a body member carrying fixed lenses, a focusing screw mounted in said body member, a bridge piece adjustable on said focusing screw, a sleeve supported on each end of said bridge piece and slidable in apertures in said body member, an eye piece mounted on each of said sleeves, an inverted U-shaped eye lens cell slidably mounted within each of said eye pieces, an eye lens mounted within each of said eye lens cells, said eye lens cells extending downwardly below said eye pieces and including at the lower ends thereof slotted flanges extending outwardly substantially to said sleeves, helical springs retained between said eye lens cell flanges and the undersides of said eye pieces, and clip members engaging said eye pieces, extending downwardly through the slots of said eye lens cell flanges and engaged to said bridge piece.

2. A binocular structure comprising a body member carrying fixed lenses, a focusing screw mounted in said body member, a bridge piece adjustable on said focusing screw, said bridge piece including a spaced pair of flanges at each end thereof, a rectangular sleeve supported on each of said bridge piece flange pairs and slidable in apertures in said body member, an eye piece mounted on each of said sleeves, an inverted U-shaped eye lens cell of rectangular cross section slidably mounted within each of said eye pieces, a rectangular eye lens mounted in each of said eye lens cells, said eye lens cells extending downwardly below said eye pieces and including at the lower ends thereof slotted flanges extending outwardly substantially to said sleeves, helical springs retained between said eye lens cell flanges and the undersides of said eye pieces, and clip members engaging said eye pieces, extending downwardly through the slots of said eye lens cell flanges and secured to said bridge piece flanges.

3. A binocular structure comprising a body member carrying fixed lenses, a focusing screw mounted in said body member, a bridge piece adjustable on said focusing screw, said bridge piece including a spaced pair of slotted flanges at each end thereof, a rectangular sleeve slidable in apertures in said body member supported on each of said bridge piece flange pairs, an eye piece mounted on each of said sleeves, an inverted U-shaped eye lens cell of rectangular cross section slidably mounted within each of said eye pieces, a rectangular eye lens mounted within each of said eye lens cells, said eye lens cells extending downwardly below said eye pieces and including at the lower ends thereof slotted flanges extending outwardly substantially to said sleeves, helical springs retained between said eye lens cell flanges and the undersides of said eye pieces, and clip members engaging said eye pieces, extending downwardly through said slotted eye lens cell flanges, and passing through the slots of said bridge piece flanges and secured to the undersides thereof by bending over.

NORMAN KERSHAW.
HARRY RYDER.

REFERENCES CITED

The following references are of record in the file of this patent:

UNITED STATES PATENTS

| Number | Name | Date |
| --- | --- | --- |
| 424,399 | De Wogan | Mar. 25, 1890 |
| 535,862 | Sawyer | Mar. 19, 1895 |
| 1,428,478 | Dunne | Sept. 5, 1922 |
| 1,952,224 | Trautmann et al. | Mar. 27, 1934 |
| 2,381,101 | Bausch | Aug. 7, 1945 |

FOREIGN PATENTS

| Number | Country | Date |
| --- | --- | --- |
| 343,732 | France | Aug. 13, 1904 |